Sept. 18, 1928.  T. B. HART  1,685,053
GLASS FURNACE
Filed June 5, 1926    4 Sheets-Sheet 1

Inventor
T. B. Hart
By Jaedli & Jaedli
Attorneys

Sept. 18, 1928.  
T. B. HART  
GLASS FURNACE  
Filed June 5, 1926  
1,685,053  
4 Sheets-Sheet 2

Sept. 18, 1928.　　　　　　　　　　　　　　　　1,685,053
T. B. HART
GLASS FURNACE
Filed June 5, 1926　　　　4 Sheets-Sheet 4

Inventor
T. B. Hart.
By
Jacobi & Jacobi
Attorneys

Patented Sept. 18, 1928.

1,685,053

UNITED STATES PATENT OFFICE.

THOMAS B. HART, OF LIBOW, WEST VIRGINIA, ASSIGNOR OF ONE-HALF TO ADAMSTON FLAT GLASS COMPANY, OF CLARKSBURG, WEST VIRGINIA, A CORPORATION.

GLASS FURNACE.

Application filed June 5, 1926. Serial No. 113,924.

This invention relates to new improvements in glass furnaces and more particularly to the type wherein molten glass of a homogeneous texture flows to a series of sheet glass drawing machines of a conventional type.

One of the principal objects of this invention is to provide an apparatus whereby the molten glass when in position to be drawn through any of the drawing wells in the series or battery of drawing machines will be of an absolute uniform and homogeneous texture, so that the resultant sheets of drawn glass will be of an even, uniform and homogeneous texture.

I realize that other devices have been invented to accomplish the results herein desired, but for various reasons the results desired cannot be accomplished, due principally to the faulty construction of heating chambers and other apparatus with respect to the "debiteuse". I overcome the objections in connection with other devices desired for this purpose, by a particular structure to be hereinafter and more particularly described.

A further object of the invention resides in the provision of a plurality of floating heating chambers adapted to receive heat therein directly from the central heating chambers, said floating chambers being so positioned with respect to the "debiteuse" as to prevent pockets or the like being formed between said debiteuse and floating chambers, whereby the molten glass drawn to the machines will at all times remain in the same texture, thus resulting in drawn glass with the elimination of distortion and other imperfections.

A further object of the invention resides in so constructing the apparatus that the current of heated air will be generated from the central heating chambers through the floating heating chambers from whence the same are conducted through the suspended arches to annealing chambers in connection with the drawing machines.

A still further object resides in the construction of improved annealing chambers arranged in triple-deck fashion, with control dampers respectively in connection therewith so that one or more sets of annealing chambers may be used, as may be desired.

Still another object of the invention resides in so constructing the furnace as to provide an independent checker chamber for each heating chamber used in connection with the drawing well.

A further object of the invention resides in constructing the upper portion of the side walls of the tank of collapsible sections spaced apart, the spaces being covered by interfitting, removable loose-leaf sections through which the combustible fuel is introduced to the furnace.

With these and other objects in view, my invention consists in the novel features of construction, combination and arrangement of parts, as will be hereinafter referred to and more particularly pointed out in the specification and claims.

In the accompanying drawings, forming a part of this application—

Figure 1:
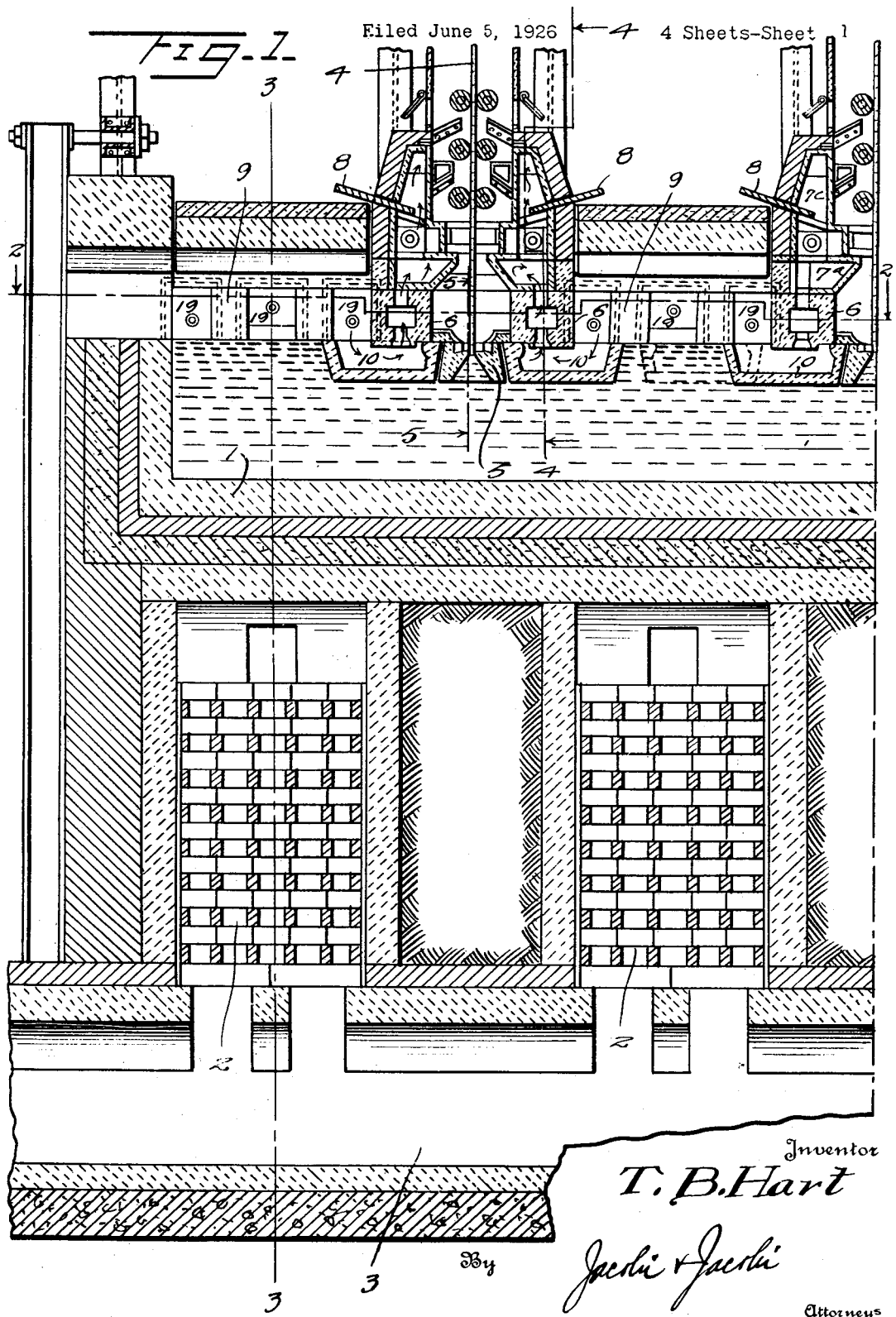
Figure 1 is a vertical section through a drawing well embodying my improvements.

In describing the invention I shall refer to the drawings in which similar reference characters designate corresponding parts throughout the several views and in which 1 designates a tank of conventional form and construction containing molten glass conveyed thereto from the melting furnace (not shown).

As stated, the tank is of the usual construction but has disposed therebelow checker chambers designated by the numeral 2 which are divided so as to provide a distinct and separate checker chamber for each central heating chamber used in connection with a well. The arrangement of this construction will be more fully understood from the illustration in the drawings, particularly Figure 1, and the description hereinafter set forth. These checker chambers lead to the exit flue 3, as usual, which leads to the usual form of stack.

The drawing machine is designated by the numeral 4 and in the drawing well is the usual or convention form of "debiteuse" designated by the numeral 5. Arranged just above the "debiteuse" and suspended in the usual manner are the suspended arches 6 which are of hollow construction having slotted openings in the top and bottom walls thereof, as clearly shown in Figure 1 of the drawings. Through these suspended arches heated air may be generated, as will be more clearly set forth herebelow.

Supported above the suspended arches on each side of the drawing machine, I provide an improved triple-deck structure designated by the numeral 7, the partitions therein forming a series of superposed annealing chambers, designated respectively by the numerals $7^a$, $7^b$ and $7^c$. It is obvious from the construction shown in Figures 1 and 4 of the drawings that the heated air and gases received within the hollow suspended arches may be generated through the annealing chambers and in connection with said annealing chambers, I provide the sliding damper plates 8 whereby the use of one or more sets of chambers may be controlled at the will of the operator. It is obvious from this construction that these chambers are so constructed that the control of varied heat curves may be maintained through and by the actuation of the various dampers, thus conforming with the requirements in properly annealing the varied weights and thicknesses of the sheet glass being drawn.

On each side of the drawing well is the central heating chamber designated by the numeral 9, the specific construction of which will be hereinafter and more particularly described. It may be stated, however, that the principle of utilizing the heat from these chambers to heat the molten glass and bring the same to a predetermined texture is the same in this apparatus as in all other furnaces of a like nature. However, I utilize an improved structure in cooperation with the central heating chambers for more completely bringing the molten glass at the well or pit to a homogeneous texture so as to prevent distortion and other imperfections in the drawn glass. To this end, I provide a pair of floating pots or the like 10, the same being substantially rectangular in cross section and positioned in abutting relation with the "debiteuse", on each side of the latter, as clearly shown in Figure 1 of the drawings. The inner opposed side walls of said pots 10 have their upper edges in abutting relation with the lower edges of the suspended arches 6 and these pots are of such width in cross section as to permit the outer opposed walls thereof to extend some distance beyond the outer opposed walls of the suspended arches and when so positioned, it will be observed that air and gases from the central heating chambers may be readily admitted to the chambers formed within these pots 10, as clearly shown in Figure 1 of the drawings. Thus, it will be seen that the pots 10 form substantially heat chambers or floating heat chambers, the same being partially submerged within the molten glass and the air and gases entering these chambers from the central heat chambers will be conducted therefrom through the suspended arches to the annealing chambers, as appears obvious from the showing in the drawings. The adjacent abutting edges of the "debiteuse" and pots 10 are sealed as shown at 11 with such material as will enable the elements to be readily separated for repair or other desired purposes.

Figures 4, 5:
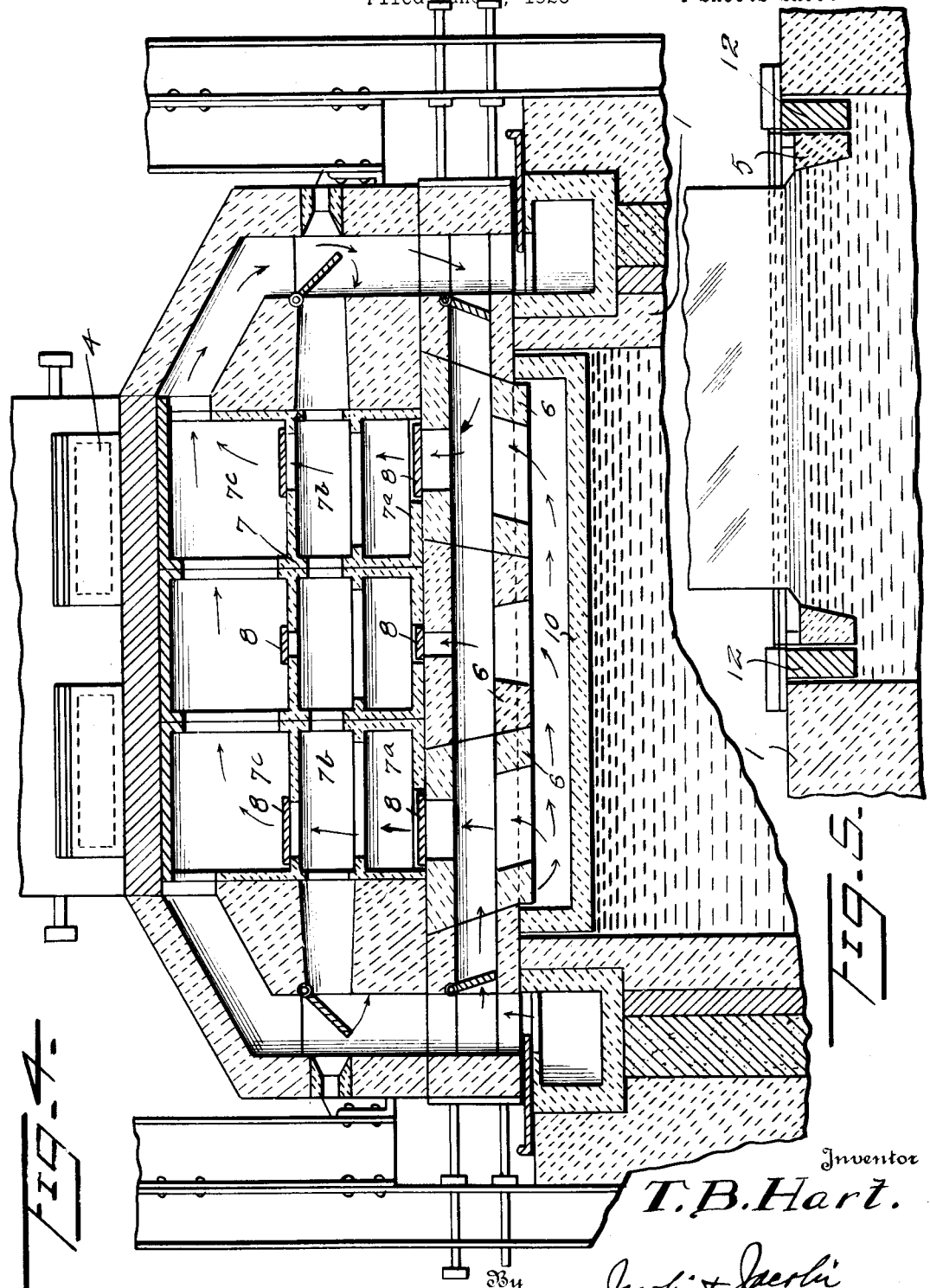
Figure 4 is an enlarged vertical section as seen on the line 4—4 of Figure 1.
Figure 5 is an enlarged vertical section as seen on the line 5—5 of Figure 1.

It will be seen from this construction that by positioning the pots 10 in abutting relation with the "debiteuse" I provide a means for generating heated air and gases directly from the central heating chambers through the suspended arches to the annealing chambers but at the same time I do not permit pockets or the like to be formed between the "debiteuse" and the pots which would permit a different texture of glass to be formed therein. Thus, all stratas of the molten glass at the well are fully and completely heated to the desired degree to form molten glass of the proper texture and thus the drawn glass will be free from distortion and other imperfections. At the ends of the "debiteuse" I provide blocks 12 which are angular in cross section and suspended from the side walls of the tank 1, the upper portions of said block resting upon the upper edges of the pots 10. These blocks are designed to conform in shape to the ends of the "debiteuse" and positioned as described, particularly as shown in Figure 5 of the drawings, will prevent pockets being formed between the "debiteuse" and the side walls of the tank 1. Thus the molten glass in the tank and in the vicinity of a well will all be forced to horizontal alinement with the lower face of the "debiteuse" prior to being drawn through the latter to the drawing machines. The purposes and advantages of this structure appear obvious from the foregoing description and statements.

Figure 2:
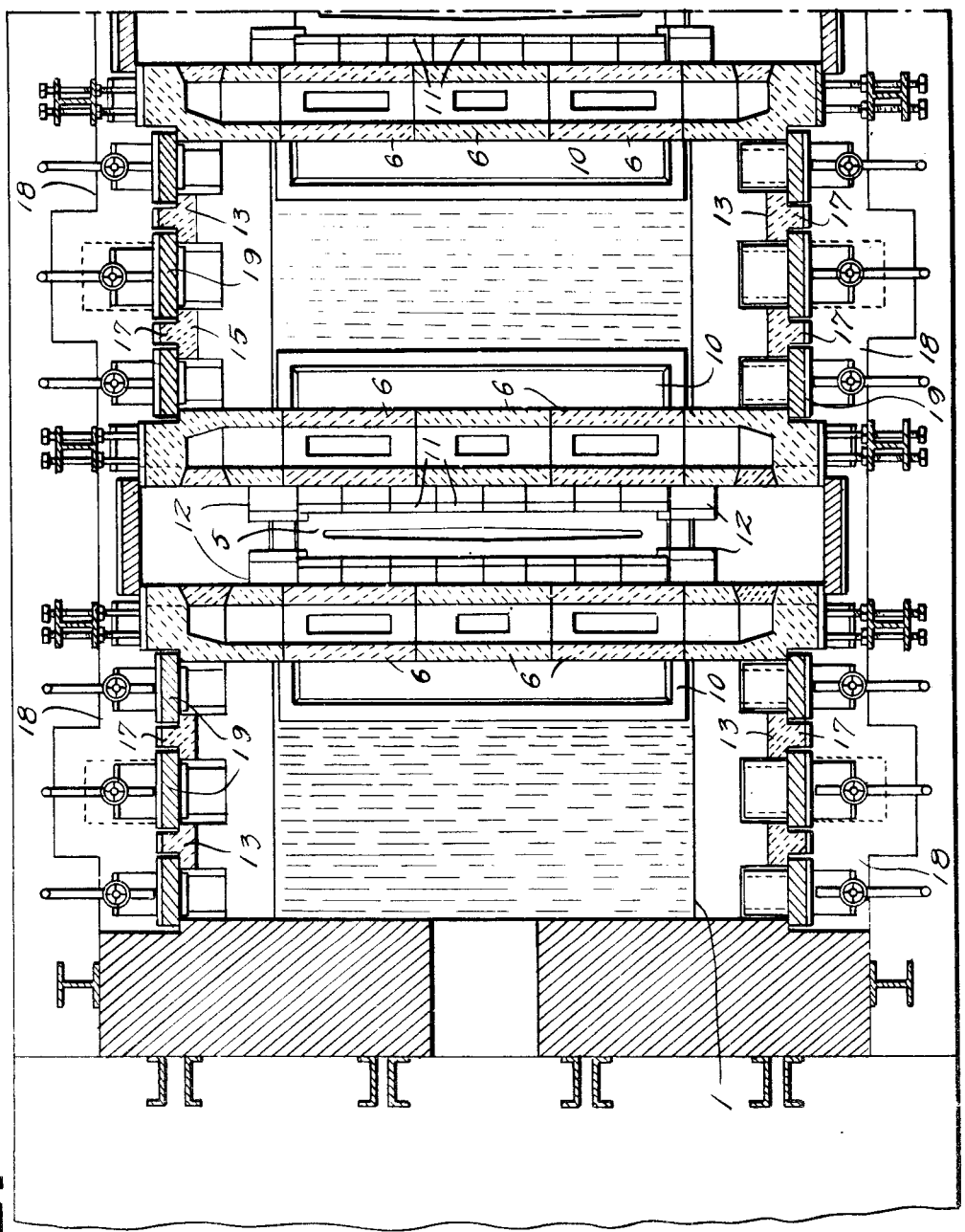
Figure 2 is a horizontal section therethrough as seen on the line 2—2 of Figure 1.
Figure 3:
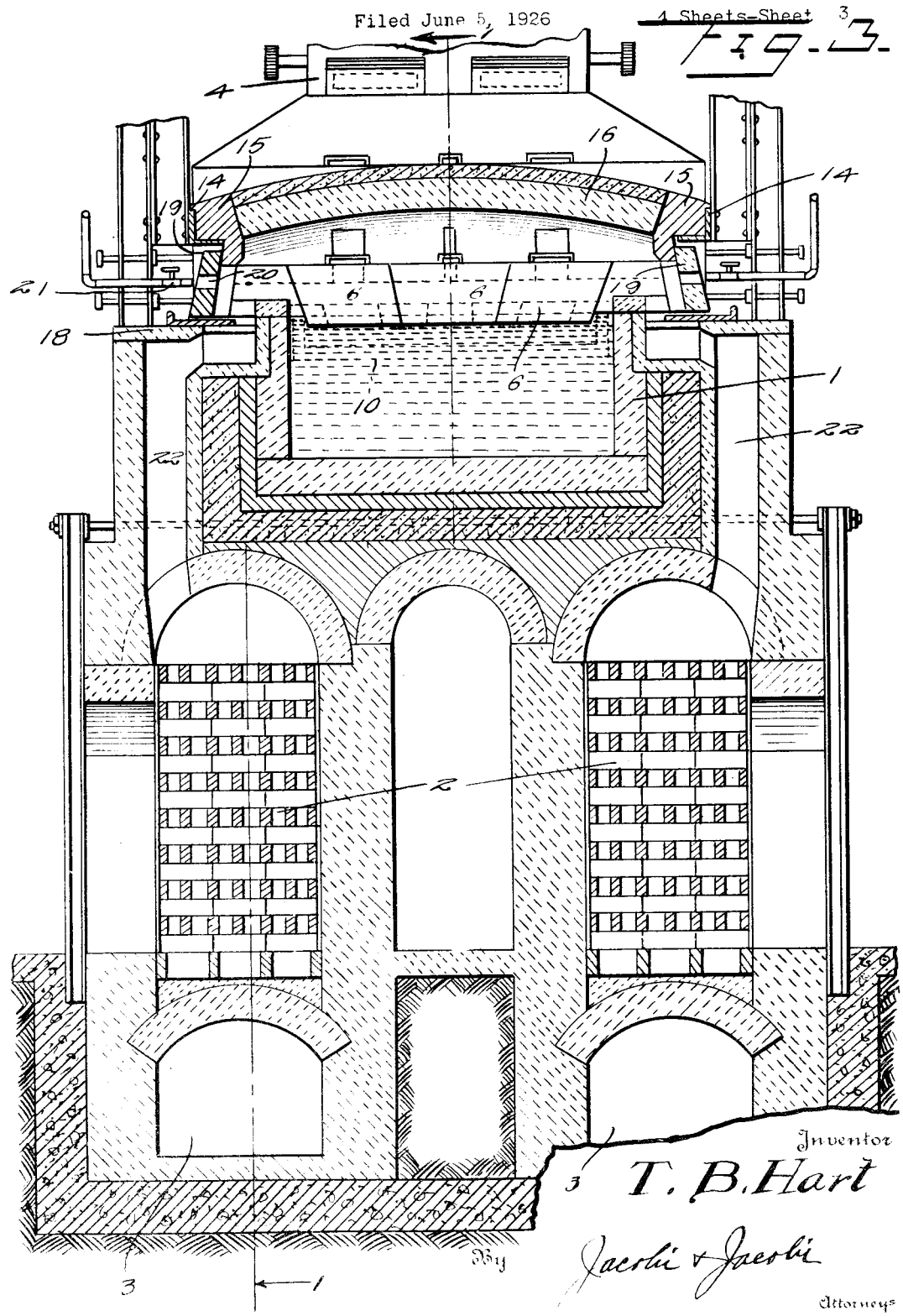
Figure 3 is a vertical section as seen on the line 3—3 of Figure 1.

In view of the particular width of the members 10 to accomplish the desired results, it becomes necessary to construct the walls of the central heating chambers 9 in a manner which will readily admit of said members 10 being introduced and removed, inasmuch as the width of said members 10 is too great to permit same to be introduced and removed through the well or pit. In describing this particular construction it will be necessary to describe other features of construction adjacent thereto. The side walls of the tank above the glass line are designated by the numeral 13 upon the upper edges of which are mounted the angle chair rails 14, the latter in turn supporting the skew-back members 15. These members 15 obviously support the arch 16 of the tank. The wall 13 is formed of a plurality of spaced apart collapsible sections, as clearly shown in Figure 2 of the drawings and each section has formed on its outer face an outwardly projecting rib 17. The sections of this wall 13 are supported on the horizontal port cover 18 which is arranged in horizontal alinement with the glass level in the tank. Also supported on this member 18 and covering the spaces between the sections of the wall 13 are the removable loose-leaf wall sections 19 which when placed in position abut snugly against the side edges of the ribs 17, as clearly shown in Figure 2 of the drawings. The loose-leaf sections 19 are each provided with a central opening 20 through which the combustible fuels are introduced from the nozzle 21, said fuels being adapted to mix with the preheated air within the chamber, of which said sections 19 form a part of the wall thereof. The superheated air is conducted from the checker chambers 2 through the conduits 22 to the central heating chamber where the same are mixed with the combustible fuels just described.

Through the medium of the loose-leaf sections 19, it is apparent that entrance and admission may be had readily to the central heating chamber so that repairs may be readily made and the members 10 quickly and readily introduced, removed and replaced when desired. In Figure 1 of the drawing, I have shown in dotted lines the position of one of the members 10 about to be removed or introduced into operative position.

From the foregoing description of the construction of my improved apparatus, the operation thereof will be readily understood and it will be seen that I have provided a simple, inexpensive and efficient means for carrying out the numerous objects of the invention.

While I have particularly described the elements best adapted to perform the various functions set forth, it is obvious that various changes in form, proportion and in the minor details of construction may be resorted to, without departing from the spirit or sacrificing any of the principles of the invention.

Having thus described my invention what I claim is:

1. In a glass furnace, a drawing well, heating chambers on opposite sides thereof, suspended arches on opposite sides of said well adjacent said chamber, said arches being hollow and having outlet and inlet openings therein, a drawing block between said arches, and means for conveying products of combustion from said heating chambers to said hollow arches.

2. In a glass furnace, a drawing well, heating chambers on opposite sides thereof, suspended arches on opposite sides of said well adjacent said chambers, said arches being hollow and having outlet and inlet openings therein, a drawing block between said arches, and means disposed below the glass level in the well for conveying products of combustion from said heating chambers to the hollow arches.

3. In a glass furnace, a drawing well, heating chambers on opposite sides thereof, suspended arches on opposite sides of said well adjacent said chambers, said arches being hollow and having inlet and outlet openings therein, a drawing block disposed between said arches, annealing chambers supported above said arches and having communication with the outlet openings of the latter, and means for conveying products of combustion from said heating chambers to said hollow arches.

4. In a glass furnace, a drawing well, heating chambers on opposite sides thereof, suspended arches on opposite sides of said well, said arches being hollow and having inlet and outlet openings in the bottom and top walls thereof, respectively, annealing chambers supported on the arches and having communication with the outlet openings of said arches, a drawing block between said arches, and floating members disposed below said arches adapted to convey the products of combustion from said heating chambers to said arches, as and for the purpose described.

5. In a glass furnace, a drawing well, heating chambers on opposite sides thereof, suspended arches on opposite sides of said well, said arches being hollow and having inlet and outlet openings in the bottom and top walls thereof, a drawing block between said arches, and floating receptacles in abutment with said drawing blocks below said arches adapted to convey products of combustion from said heating chambers to said hollow arches.

6. In a glass furnace, a drawing well, heating chambers on opposite sides thereof, suspended arches on opposite sides of said well, said arches being hollow and having inlet and outlet openings in the bottom and top walls thereof, a drawing block between said arches, and floating receptacles abutting the side faces of said drawing block and the lower faces of said arches, said receptacles being of a cross sectional width to extend beyond the outer side faces of said arches to receive directly therein products of combustion from said heating chambers, and convey the same to said hollow arches.

7. In a glass furnace, a drawing well, heating chambers on opposite sides thereof, suspended arches on opposite sides of said well, said arches being hollow and having inlet and outlet openings in the bottom and top walls thereof, a drawing block between said arches, casings supported upon said arches and partitioned to provide a plurality of superposed and intercommunicating annealing chambers having communication with the outlet openings of said arches, and means for conveying products of combustion from said heating chambers to said hollow arches.

8. In a glass furnace, a drawing well, heating chambers on opposite sides thereof, suspended arches on opposite sides of said well, said arches being hollow and having inlet and outlet openings in the bottom and top walls thereof, a drawing block between said arches, casings supported upon said arches and partitioned to provide a plurality of superposed and intercommunicating annealing chambers having communication with the outlet openings of said arches, means for conveying products of combustion from said heating chambers to said hollow arches for circulation through said annealing chambers and means for controlling the flow of said products of combustion through the respective annealing chambers.

9. In a glass furnace, a tank, including bottom, side and end walls, an arch therefor, the upper portion of the side walls of said tank being formed of a plurality of spaced removable sections and a loose-leaf section interfitting between said removable sections and covering the space therebetween.

10. In a glass furnace, a tank, including bottom, side and end walls, an arch therefor, the upper portion of the side walls of said tank being formed of a plurality of spaced apart removable sections and a plurality of loose-leaf sections interfitting between the aforesaid sections and covering the spaces between the latter, said loose-leaf sections being provided with openings for the introduction of combustible fuel therethrough.

In testimony whereof I affix my signature.

THOMAS B. HART.